(12) United States Patent
Bańkowski et al.

(10) Patent No.: US 12,166,403 B2
(45) Date of Patent: Dec. 10, 2024

(54) COOLING OF ACTIVE ELEMENTS OF ELECTRICAL MACHINES

(71) Applicant: General Electric Renovables Espana, S.L., Barcelona (ES)

(72) Inventors: Szymon Bańkowski, Warsaw (PL); Sadeo Ramtahal, Schenectady, NY (US); Julio Cesar Urresty, Barcelona (ES)

(73) Assignee: General Electric Renovables Espana, S.L., Barcelona (ES)

( * ) Notice: Subject to any disclaimer, the term of this patent is extended or adjusted under 35 U.S.C. 154(b) by 232 days.

(21) Appl. No.: 17/869,022

(22) Filed: Jul. 20, 2022

(65) Prior Publication Data
US 2023/0034879 A1 Feb. 2, 2023

(30) Foreign Application Priority Data

Jul. 28, 2021 (EP) .................................... 21382701

(51) Int. Cl.
*H02K 7/18* (2006.01)
(52) U.S. Cl.
CPC ....... *H02K 7/1838* (2013.01); *H02K 2201/03* (2013.01); *H02K 2213/03* (2013.01)
(58) Field of Classification Search
CPC ............. H02K 7/1838; H02K 2201/03; H02K 2213/03
USPC ........................................................ 310/40 R
See application file for complete search history.

(56) References Cited

U.S. PATENT DOCUMENTS

| 4,293,785 | A | 10/1981 | Jackson, Jr. |
| 11,303,194 | B1* | 4/2022 | Jansen ................. H02K 13/003 |
| 2011/0133472 | A1* | 6/2011 | Middendorf ........... F03D 80/00 |
| | | | 290/55 |
| 2017/0288501 | A1* | 10/2017 | Eriksen ................... H02K 7/183 |
| 2017/0353080 | A1* | 12/2017 | Thygesen ............ H02K 1/2791 |
| 2018/0212481 | A1* | 7/2018 | Semken ................. H02K 1/185 |
| 2022/0263359 | A1* | 8/2022 | Mongeau ............. H02K 15/028 |
| 2022/0399767 | A1* | 12/2022 | Bove ........................ H02K 9/08 |
| 2022/0416602 | A1* | 12/2022 | Azar ........................ H02K 9/04 |

(Continued)

FOREIGN PATENT DOCUMENTS

| CN | 209786900 U | 12/2019 |
| JP | S56169778 U | 12/1981 |

OTHER PUBLICATIONS

European Search Report Corresponding to EP21382701 on Feb. 3, 2022.

*Primary Examiner* — Rashad H Johnson
(74) *Attorney, Agent, or Firm* — Dority & Manning, P.A.

(57) ABSTRACT

The present disclosure relates to electrical machines and methods for cooling active elements of electrical machines. More in particular, the present disclosure relates to generators and methods for cooling adjacent active rotor elements and/or adjacent active stator elements of a generator of a wind turbine, e.g. of a direct drive wind turbine. An electrical machine comprises a rotor including a plurality of active rotor elements, a stator including a plurality of active stator elements, and an air gap separating the active rotor elements and the active stator elements. The electrical machine further comprises a radiation absorber arranged between a first and a second adjacent active rotor elements or between a first and a second adjacent active stator elements.

19 Claims, 4 Drawing Sheets

(56) References Cited

U.S. PATENT DOCUMENTS

| | | | |
|---|---|---|---|
| 2023/0383724 A1* | 11/2023 | Drots | F03D 1/0691 |
| 2024/0097528 A1* | 3/2024 | Müller et al. | H02K 1/20 |
| 2024/0097529 A1* | 3/2024 | Feith | H02K 1/2789 |
| 2024/0106286 A1* | 3/2024 | Jensen | H02K 1/20 |

* cited by examiner

COOLING OF ACTIVE ELEMENTS OF ELECTRICAL MACHINES

TECHNICAL FIELD

The present disclosure relates to electrical machines and methods for cooling active elements of electrical machines. More in particular, the present disclosure relates to generators and methods for cooling adjacent active rotor elements and/or adjacent active stator elements of a generator of a wind turbine, e.g. of a direct drive wind turbine.

BACKGROUND

Electrical machines, such as motors and generators, generally comprise a rotor structure and a stator structure. Large electrical generators may be e.g. electrically excited generators or permanent magnet excited generators (PMG). The rotor of an electrical machine rotates with respect to the stator. The rotor may be the inner structure and the stator the outer structure. The stator in this case thus surrounds, e.g. radially, the rotor. Alternatively, the configuration may be the opposite, i.e. the rotor surrounds, e.g. radially, the stator.

Such generators may be used for example in wind turbines. Wind turbines generally comprise a rotor with a rotor hub and a plurality of blades. The rotor is set into rotation under the influence of the wind on the blades. The rotation of the rotor shaft either drives the generator rotor directly ("directly driven") or through the use of a gearbox.

A direct drive wind turbine generator may have e.g. a diameter of 6-10 meters (236-328 inches), a length of e.g. 2-3 meters (79-118 inches) and may rotate at low speed, for example in the range of 2 to 20 rpm (revolutions per minute). Alternatively, generators may also be coupled to a gearbox which increases the rotational speed of the generator to for example between 50 to 500 rpm or even more.

In electrical machines, such as generators of direct drive wind turbines, cooling is generally important. In particular, the active elements of the rotor and the stator, e.g. permanent magnets and coils, may heat up. An increase in temperature of the active rotor and stator elements may lead to failure of the active elements and may reduce the efficiency of the generator. To reduce the temperature of the active elements of the rotor and the stator, a cooling fluid may be run through the air gap separating the active elements. The cooling fluid contacts the active elements and takes heat from them away. A cooling system may be provided for guiding the cooling fluid towards and away from the air gap, and thus removing heat from the active elements of the rotor and the stator.

Thermal radiation emitted by the active elements, i.e. electromagnetic radiation of thermal nature, mainly in the infrared region of the electromagnetic spectrum, increases the temperature of neighboring active elements. According to the Stefan-Boltzmann law, the power radiated from an object, herein an active element, increases with the fourth power of the temperature of the object. Therefore, a relatively small increase in the temperature of an active element may cause a relevant increase in the power that the active element radiates.

In addition, the emissivity of the surface of the active elements (the emissivity may be defined as the ratio of the thermal radiation from a surface to the radiation from an ideal black surface at the same temperature as given by the Stefan-Boltzmann law) may be close to 1, i.e. they may be particularly effective in emitting energy as thermal radiation. For example, the emissivity of a coil may be about or above 0.9. Therefore, a first active element may heat an adjacent second active element by radiation, thus further increasing the temperature of the second active element, and vice versa. For example, two adjacent active stator elements or two adjacent active rotor elements, may heat each other by thermal radiation.

Accordingly, thermal radiation increases the cooling requirements for the active elements of the electrical machine. More powerful cooling systems may be required to cool the active elements. As a temperature of the active elements may not overcome a temperature threshold above which failure of the elements ensues, thermal radiation also limits the power that e.g. a generator may output.

SUMMARY

In an aspect of the present disclosure, an electrical machine is provided. The electrical machine comprises a rotor and a stator. The rotor comprises a plurality of active rotor elements and the stator comprises a plurality of active stator elements. The electrical machine further comprises an air gap separating the active rotor elements and the active stator elements. The electrical machine further comprises a radiation absorber arranged between a first and a second adjacent active rotor elements or between a first and a second adjacent active stator elements.

According to this aspect, a radiation absorber is provided between two adjacent elements of the rotor or two adjacent elements of the stator. When the active elements heat up while in use, the radiation absorber may absorb at least a portion of the thermal radiation emitted by the adjacent active elements, thereby avoiding that at least a portion of the thermal radiation emitted by the first active element reaches the second active element, and vice versa. A cooling fluid run through adjacent active elements, and thus along the radiation element, may reduce the temperature of the active elements and of the radiation absorber e.g. due to convection.

Therefore, the temperature of the adjacent active elements may be reduced in comparison to a situation in which the radiation absorber was absent. As the temperature of the active elements is reduced, the life service of the active elements may be increased. Also, a size of a cooling system fluidly connected to the active elements may be reduced. In addition, a power output of an electrical machine may be increased. As the active elements may not reach a temperature threshold above which the active elements may fail, the power production of the electrical machine may be increased as the active elements may stand higher temperatures. Depending on the requirements of power production and life service of the active elements, increasing a life service of the active elements may be balanced with increasing a power output of the electrical machine.

A radiation absorber may be understood throughout this disclosure as an element capable of absorbing incident thermal radiation. The higher the absorptivity of the radiation absorber, the better the absorption capabilities of the radiation absorber. Absorptivity may be understood throughout this disclosure as the ratio of the electromagnetic radiation, in particular thermal radiation, incident on a surface that is absorbed by the surface. Absorptivity may be also known as absorptance. Throughout the present disclosure, thermal radiation may particularly be regarded as electromagnetic radiation that is at a non-zero temperature in the wavelength range from 0.1 μm to 100 μm. The term thermal radiation is frequently used to distinguish this form of electromagnetic radiation from other forms, such as radio waves, x-rays, or gamma rays.

Active elements, as used throughout the present disclosure, may be regarded as elements of the rotor and/or the stator that are magnetically and/or electrically active. An active stator element may for example be one or more permanent magnets, one or more permanent magnet modules, one or more coils, or one or more coil modules. An active rotor element may likewise be one or more permanent magnets, one or more permanent magnet modules, one or more coils, or one or more coil modules. For example, an active stator element may be a coil, and an active rotor element may be a permanent magnet module. In other examples, both the active stator elements and the active rotor elements may be coils.

An electrical machine may be a generator, in particular a generator for a wind turbine, and more in particular a generator for a direct drive wind turbine.

In a further aspect, a method is provided. The method comprises rotating a rotor of an electrical machine. The method further comprises running a cooling fluid between adjacent active rotor elements and between adjacent active stator elements such that the cooling fluid also flows around a plurality of radiation absorbers included at least between one of adjacent active rotor elements and adjacent active stator elements.

In yet a further aspect, a generator for a wind turbine is provided. The generator comprises a rotor including a plurality of active rotor elements, a stator comprising a plurality of active stator elements, and an air gap separating the active rotor elements and the active stator elements. The generator further comprises a plurality of radiation absorption sheets arranged between adjacent active rotor elements and/or between adjacent active stator elements.

DETAILED DESCRIPTION OF EXAMPLES

Figure 1:
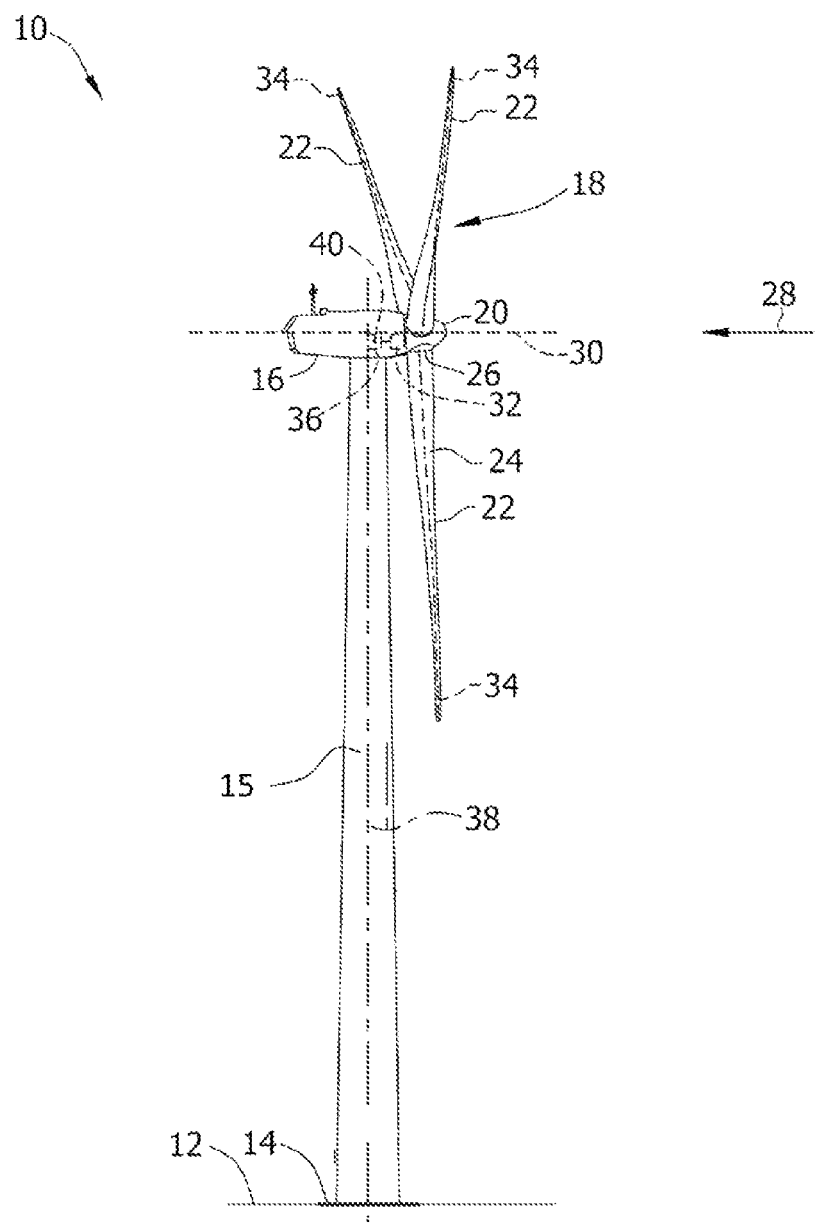
FIG. 1 schematically illustrates a perspective view of one example of a wind turbine.

Reference now will be made in detail to embodiments of the disclosure, one or more examples of which are illustrated in the drawings. Each example is provided by way of explanation of the disclosure, not as a limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

Although a generator for a direct drive wind turbine is mainly referred to herein, the examples disclosed herein can be applied in general to electrical machines.

FIG. 1 is a perspective view of an example of a wind turbine 10. In the example, the wind turbine 10 is a horizontal-axis wind turbine. Alternatively, the wind turbine 10 may be a vertical-axis wind turbine. In the example, the wind turbine 10 includes a tower 15 that extends from a support system 14 on a ground 12, a nacelle 16 mounted on tower 15, and a rotor 18 that is coupled to nacelle 16. The rotor 18 includes a rotatable hub 20 and at least one rotor blade 22 coupled to and extending outward from the hub 20. In the example, the rotor 18 has three rotor blades 22. In an alternative embodiment, the rotor 18 includes more or less than three rotor blades 22. The tower 15 may be fabricated from tubular steel to define a cavity (not shown in FIG. 1) between a support system 14 and the nacelle 16. In an alternative embodiment, the tower 15 is any suitable type of a tower having any suitable height. According to an alternative, the tower can be a hybrid tower comprising a portion made of concrete and a tubular steel portion. Also, the tower can be a partial or full lattice tower. A wind turbine 10 may be placed both onshore and offshore.

The rotor blades 22 are spaced about the hub 20 to facilitate rotating the rotor 18 to enable kinetic energy to be transferred from the wind into usable mechanical energy, and subsequently, electrical energy. The rotor blades 22 are mated to the hub 20 by coupling a blade root portion 24 to the hub 20 at a plurality of load transfer regions 26. The load transfer regions 26 may have a hub load transfer region and a blade load transfer region (both not shown in FIG. 1). Loads induced to the rotor blades 22 are transferred to the hub 20 via the load transfer regions 26.

In examples, the rotor blades 22 may have a length ranging from about 15 meters (m) to about 90 m or more. Rotor blades 22 may have any suitable length that enables the wind turbine 10 to function as described herein. For example, non-limiting examples of blade lengths include 20 m or less, 37 m, 48.7 m, 50.2 m, 52.2 m or a length that is greater than 91 m. As wind strikes the rotor blades 22 from a wind direction 28, the rotor 18 is rotated about a rotor axis 30. As the rotor blades 22 are rotated and subjected to centrifugal forces, the rotor blades 22 are also subjected to various forces and moments. As such, the rotor blades 22 may deflect and/or rotate from a neutral, or non-deflected, position to a deflected position.

Moreover, a pitch angle of the rotor blades 22, i.e., an angle that determines an orientation of the rotor blades 22 with respect to the wind direction, may be changed by a pitch system 32 to control the load and power generated by the wind turbine 10 by adjusting an angular position of at least one rotor blade 22 relative to wind vectors. Pitch axes 34 of rotor blades 22 are shown. During operation of the wind turbine 10, the pitch system 32 may particularly change a pitch angle of the rotor blades 22 such that the angle of attack of (portions of) the rotor blades are reduced, which facilitates reducing a rotational speed and/or facilitates a stall of the rotor 18.

In the example, a blade pitch of each rotor blade 22 is controlled individually by a wind turbine controller 36 or by a pitch control system 80. Alternatively, the blade pitch for all rotor blades 22 may be controlled simultaneously by said control systems.

Further, in the example, as the wind direction 28 changes, a yaw direction of the nacelle 16 may be rotated about a yaw axis 38 to position the rotor blades 22 with respect to wind direction 28.

In the example, the wind turbine controller 36 is shown as being centralized within the nacelle 16, however, the wind turbine controller 36 may be a distributed system throughout the wind turbine 10, on the support system 14, within a wind farm, and/or at a remote-control center. The wind turbine controller 36 includes a processor 40 configured to perform the methods and/or steps described herein. Further, many of the other components described herein include a processor.

As used herein, the term "processor" is not limited to integrated circuits referred to in the art as a computer, but broadly refers to a controller, a microcontroller, a microcomputer, a programmable logic controller (PLC), an application specific, integrated circuit, and other programmable circuits, and these terms are used interchangeably herein. It should be understood that a processor and/or a control system can also include memory, input channels, and/or output channels.

Figure 2:
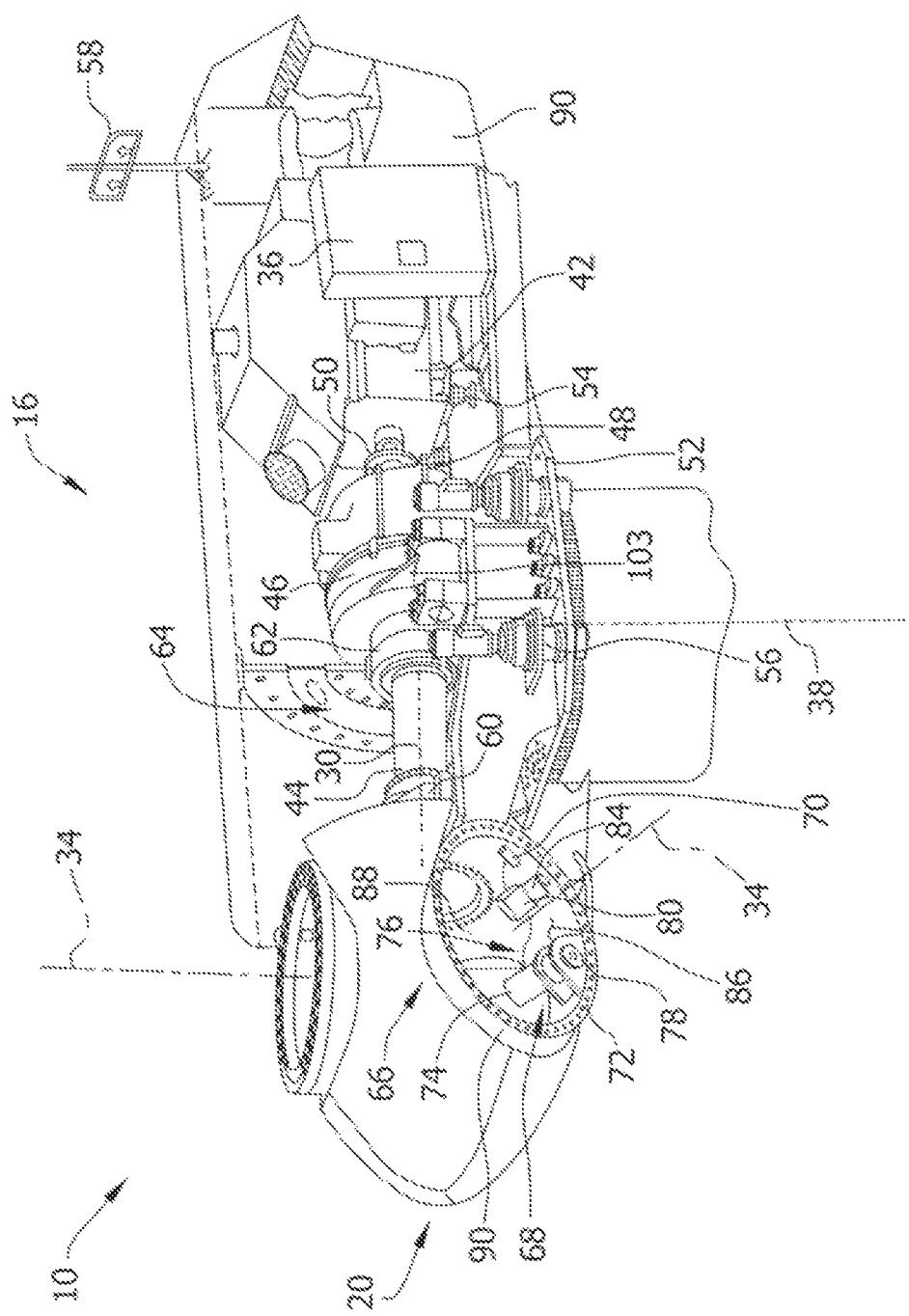
FIG. 2 illustrates an example of a hub and a nacelle of a wind turbine.

FIG. 2 is an enlarged sectional view of a portion of the wind turbine 10. In the example, the wind turbine 10 includes the nacelle 16 and the rotor 18 that is rotatably coupled to the nacelle 16. More specifically, the hub 20 of the rotor 18 is rotatably coupled to an electric generator 42 positioned within the nacelle 16 by the main shaft 44, a gearbox 46, a high-speed shaft 48, and a coupling 50. In the example, the main shaft 44 is disposed at least partially coaxial to a longitudinal axis (not shown) of the nacelle 16. A rotation of the main shaft 44 drives the gearbox 46 that subsequently drives the high-speed shaft 48 by translating the relatively slow rotational movement of the rotor 18 and of the main shaft 44 into a relatively fast rotational movement of the high-speed shaft 48. The latter is connected to the generator 42 for generating electrical energy with the help of a coupling 50. Furthermore, a transformer 90 and/or suitable electronics, switches, and/or inverters may be arranged in the nacelle 16 in order to transform electrical energy generated by the generator 42 having a voltage between 400V to 1000 V into electrical energy having medium voltage (10-35 KV). Said electrical energy is conducted via power cables from the nacelle 16 into the tower 15.

The gearbox 46, generator 42 and transformer 90 may be supported by a main support structure frame of the nacelle 16, optionally embodied as a main frame 52. The gearbox 46 may include a gearbox housing that is connected to the main frame 52 by one or more torque arms 103. In the example, the nacelle 16 also includes a main forward support bearing 60 and a main aft support bearing 62. Furthermore, the generator 42 can be mounted to the main frame 52 by decoupling support means 54, in particular in order to prevent vibrations of the generator 42 to be introduced into the main frame 52 and thereby causing a noise emission source.

Optionally, the main frame 52 is configured to carry the entire load caused by the weight of the rotor 18 and components of the nacelle 16 and by the wind and rotational loads, and furthermore, to introduce these loads into the tower 15 of the wind turbine 10. The rotor shaft 44, generator 42, gearbox 46, high speed shaft 48, coupling 50, and any associated fastening, support, and/or securing device including, but not limited to, support 52, and forward support bearing 60 and aft support bearing 62, are sometimes referred to as a drive train 64.

In some examples, the wind turbine may be a direct drive wind turbine without gearbox 46. Generator 42 operate at the same rotational speed as the rotor 18 in direct drive wind turbines. They therefore generally have a much larger diameter than generators used in wind turbines having a gearbox 46 for providing a similar amount of power than a wind turbine with a gearbox.

The nacelle 16 also may include a yaw drive mechanism 56 that may be used to rotate the nacelle 16 and thereby also the rotor 18 about the yaw axis 38 to control the perspective of the rotor blades 22 with respect to the wind direction 28.

For positioning the nacelle 16 appropriately with respect to the wind direction 28, the nacelle 16 may also include at least one meteorological measurement system which may include a wind vane and anemometer. The meteorological measurement system 58 can provide information to the wind turbine controller 36 that may include wind direction 28 and/or wind speed. In the example, the pitch system 32 is at least partially arranged as a pitch assembly 66 in the hub 20. The pitch assembly 66 includes one or more pitch drive systems 68 and at least one sensor 70. Each pitch drive system 68 is coupled to a respective rotor blade 22 (shown in FIG. 1) for modulating the pitch angel of a rotor blade 22 along the pitch axis 34. Only one of three pitch drive systems 68 is shown in FIG. 2.

In the example, the pitch assembly 66 includes at least one pitch bearing 72 coupled to hub 20 and to a respective rotor blade 22 (shown in FIG. 1) for rotating the respective rotor blade 22 about the pitch axis 34. The pitch drive system 68 includes a pitch drive motor 74, a pitch drive gearbox 76, and a pitch drive pinion 78. The pitch drive motor 74 is coupled to the pitch drive gearbox 76 such that the pitch drive motor 74 imparts mechanical force to the pitch drive gearbox 76. The pitch drive gearbox 76 is coupled to the pitch drive pinion 78 such that the pitch drive pinion 78 is rotated by the pitch drive gearbox 76. The pitch bearing 72 is coupled to pitch drive pinion 78 such that the rotation of the pitch drive pinion 78 causes a rotation of the pitch bearing 72.

Pitch drive system 68 is coupled to the wind turbine controller 36 for adjusting the pitch angle of a rotor blade 22 upon receipt of one or more signals from the wind turbine controller 36. In the example, the pitch drive motor 74 is any suitable motor driven by electrical power and/or a hydraulic system that enables pitch assembly 66 to function as described herein. Alternatively, the pitch assembly 66 may include any suitable structure, configuration, arrangement, and/or components such as, but not limited to, hydraulic cylinders, springs, and/or servomechanisms. In certain embodiments, the pitch drive motor 74 is driven by energy extracted from a rotational inertia of hub 20 and/or a stored energy source (not shown) that supplies energy to components of the wind turbine 10.

The pitch assembly 66 may also include one or more pitch control systems 80 for controlling the pitch drive system 68 according to control signals from the wind turbine controller 36, in case of specific prioritized situations and/or during rotor 18 overspeed. In the example, the pitch assembly 66 includes at least one pitch control system 80 communicatively coupled to a respective pitch drive system 68 for controlling pitch drive system 68 independently from the wind turbine controller 36. In the example, the pitch control system 80 is coupled to the pitch drive system 68 and to a sensor 70. During normal operation of the wind turbine 10, the wind turbine controller 36 may control the pitch drive system 68 to adjust a pitch angle of rotor blades 22.

According to an embodiment, a power generator 84, for example comprising a battery and electric capacitors, is arranged at or within the hub 20 and is coupled to the sensor 70, the pitch control system 80, and to the pitch drive system 68 to provide a source of power to these components. In the example, the power generator 84 provides a continuing source of power to the pitch assembly 66 during operation of the wind turbine 10. In an alternative embodiment, power generator 84 provides power to the pitch assembly 66 only during an electrical power loss event of the wind turbine 10. The electrical power loss event may include power grid loss or dip, malfunctioning of an electrical system of the wind turbine 10, and/or failure of the wind turbine controller 36. During the electrical power loss event, the power generator 84 operates to provide electrical power to the pitch assembly 66 such that pitch assembly 66 can operate during the electrical power loss event.

In the example, the pitch drive system 68, the sensor 70, the pitch control system 80, cables, and the power generator 84 are each positioned in a cavity 86 defined by an inner surface 88 of hub 20. In an alternative embodiment, said components are positioned with respect to an outer surface of hub 20 and may be coupled, directly or indirectly, to the outer surface.

In an aspect of the disclosure, an electrical machine 100 is provided. The electrical machine 100 comprises rotor 110 and a stator 120. The rotor 120 comprises a plurality of active rotor elements 115 and the stator comprises a plurality of active stator elements 125. The electrical machine 100 further comprises an air gap 116 separating the active rotor elements 115 and the active stator elements 125. The electrical machine 100 further comprises a radiation absorber 130 arranged between a first 111 and a second 112 adjacent active rotor elements or between a first 121 and a second 122 adjacent active stator elements.

Figure 3:
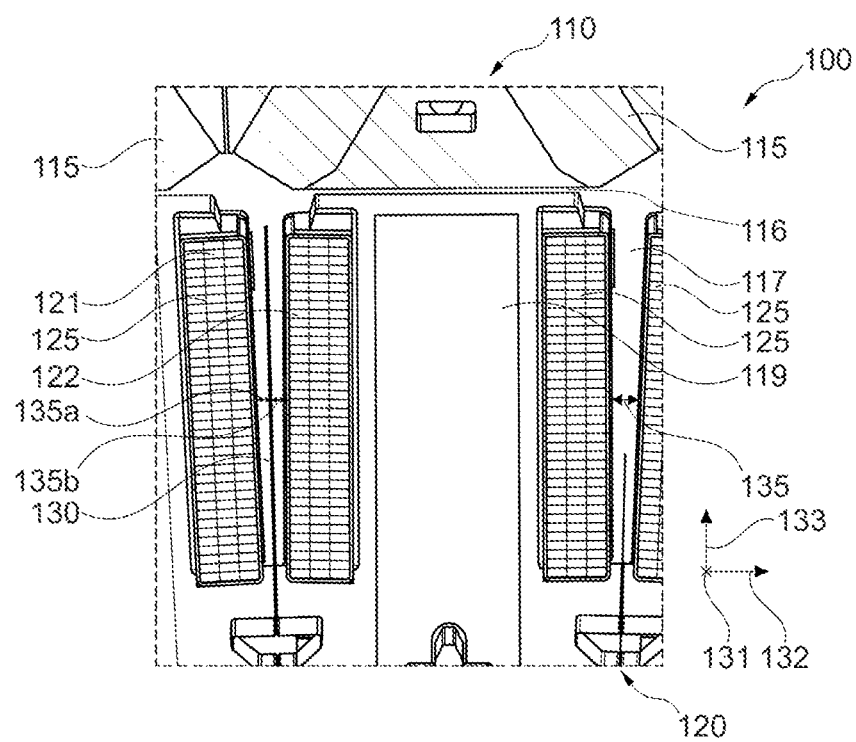
FIG. 3 schematically illustrates an enlarged cross-sectional view of an electrical machine according to an example.

FIG. 3 schematically shows an enlarged view of a cross-section of an electrical machine 100. In this example, the electrical machine 100 is a radial machine, in particular a generator 42. The generator may be a generator for a wind turbine 10, and more in particular for a direct drive wind turbine. The active rotor elements 115 are permanent magnet modules, and the active stator elements 125 are coils, but other active rotor elements and stator elements are possible. For example, both active rotor and stator elements may be coils. As illustrated in FIG. 3, the stator coils 125 are wound around stator teeth 119.

A permanent magnet module may be defined as a unit having a plurality of permanent magnets such that the plurality of magnets can be mounted and unmounted together. Such a module may have a module base with a shape suitable for housing or receiving a plurality of permanent magnets. The magnets may be fixed to the base in a diversity of manners. The base may be configured to be fixed to a field rim, e.g. to a rotor rim, in such a way that the plurality of magnets are fixed together to the field rim through the module base. The use of permanent magnet modules may facilitate the manufacturing of a generator field.

In FIG. 3, the rotor 110 surrounds the stator 120, but in other examples the stator 120 may surround the rotor 110. Similarly, other configurations and other types of electrical machines 100 may be used. For example, the electrical machine 100 may be an axial machine, e.g. an axial generator. The electrical machine 100 may in some other examples be a motor.

The electrical machine 100 further comprises a radiation absorber 130 between two adjacent active elements, in this figure between two circumferentially 132 adjacent active stator elements 125 such as coils. The electrical machine 100 may comprise one or more radiation absorbers 130 in the stator 120 and/or one or more radiation absorbers 130 in the rotor 110. For example, the electrical machine 100 may comprise a radiation absorber 130 between each pair of adjacent active stator elements 125. Alternatively or additionally, the electrical machine 100 may comprise a radiation absorber 130 between each pair of adjacent active rotor elements 115.

The radiation absorber 130 may have an absorptivity above 0.8, more in particular above 0.9, and more in particular above 0.95. In some examples, the absorption of the radiation absorber may be about 0.98. The absorptivity may indicate how efficient the radiation absorber is in absorbing thermal radiation. The closer the absorptivity value is to 1, the better the absorber is. In some examples, the radiation absorber 130 may be black.

The radiation absorber 130 may, in some examples, have a treated surface for having suitable or enhanced thermal absorption properties. The radiation absorber may e.g. have a thermal radiation absorbing coating. Thermal radiation absorbing paint, e.g. infrared radiation absorbing paint, may be used for painting the radiation absorber 130. One or more thermal radiation, e.g. infrared radiation, absorber film or foils may be used to cover (partially or totally) the radiation absorber. A radiation absorber 130 may comprise both thermal radiation absorber paint and film(s).

In some examples, the radiation absorber 130 may comprise one or more metal alloys. Metal alloys may be suitable for efficiently absorbing thermal radiation. A metal alloy may e.g. include a silver alloy, a copper alloy, an aluminum alloy or a brass alloy. A surface of a metal alloy radiation absorber 130 may be treated, e.g. it may be painted with one or more thermal radiation absorbing paints and/or covered with one or more thermal radiation absorber film or foils.

The radiation absorber 130 may be arranged in a middle region between two adjacent active stator elements 121, 122 or between two adjacent active rotor elements 111,112. I.e., the radiation absorber 130 may be arranged such that a distance 135*a* between the radiation absorber 130 and the first adjacent active element 111,121 is similar or substantially the same as a distance 135*b* between the radiation absorber 130 and the second adjacent active element 112, 122. A distance 135*a*, 135*b* between the radiation absorber and an active element may be measured in a circumferential direction 132 at a given radial height.

Having a radiation absorber 130 arranged between two adjacent active elements of the rotor 111, 112 or between two adjacent active elements of the stator 120, 121, in particular when distances 135*a*, 135*b* from the absorber 130 to the adjacent elements are substantially the same, may improve the use of the cooling fluid between the adjacent active elements. If the absence of a radiation absorber 130, only a portion of the cooling fluid close to or in contact with the active elements is heated and carries away the heat for diminishing the temperature of the active elements. But when a radiation absorber 130 is used, a portion of the cooling fluid close to or in contact with the absorber 130 is heated, and carries away the heat, too. Accordingly, a better use of the cooling fluid may be achieved by arranging a radiation absorber 130 between two adjacent active rotor or stator elements, and in particular if the radiation absorber 130 is placed at a substantially same distance 135*a*, 135*b* from the active elements. Cooling efficiency may therefore be increased.

In the example of FIG. 3, it may be seen that in a radial direction, the separation between neighboring coils increases slightly. The thickness of the radiation absorber sheet 130 is constant in this particular example. In other examples, the thickness of the radiation absorber may be varied in the radial direction. In some examples, the thickness of the radiation absorber may be varied such that the distance to the neighboring coils (or magnets) is substantially constant in the radial direction, i.e. along a height of the radiation absorber.

The radiation absorber 130 may have a length, e.g. in an axial direction 131, a height, e.g. in a radial direction 133 and a width, e.g. in a circumferential direction 132. The radiation absorber may have a thickness, i.e. a width, between 0.1 and 5 millimeters (mm), more in particular between 0.1 and 3 mm, and more in particular between 0.2 and 1 millimeters, e.g. about 0.5 mm.

Arranging a radiation absorber 130 between adjacent active elements 115 in the rotor 110 or between adjacent active elements 125 in the stator 120 may interfere in the flow of a cooling fluid between the adjacent active elements. In some examples, a thickness of a radiation absorber 130 may e.g. be between 1% and 20%, more in particular between 1% and 10%, and more in particular between 2% and 5% of a distance 135 between adjacent active elements 121, 122. The flow of the cooling fluid may be reduced, but this reduction may be compensated by the heat absorption provided by the radiation absorber 130.

A width in the above ranges may allow to compensate the decrease in cooling by arranging the radiation absorber 130 between adjacent active elements by an increase in heat removal by the radiation absorber 130. In some examples, a flow of a cooling fluid may be reduced between 2 and 4% due to the arrangement of a radiation absorber 130, but the radiation absorber 130 may increase cooling about a 10%. Therefore, heat removal is improved.

The radiation absorber 130 may extend partially or totally along a dimension of an active element 115, 125. Similarly to the radiation absorber 130, an active element 115, 125 may have a length, e.g. in an axial direction 131, a height, e.g. in a radial direction 133 and a width, e.g. in a circumferential direction 132. A radiation absorber 130 may partially or totally extend along any of the dimensions of an active element 115, 125. For example, in FIG. 3 the radiation absorber 130 totally extends along a height of an active element 125.

The active elements 115, 125 may be connected, e.g. attached, to a rotor rim or to a stator rim. A height of an active element 115, 125 may be measured, in general, substantially perpendicularly to a local surface of the rotor rim or the stator rim to which the active element is connected, e.g. attached. Similarly, a height of the radiation absorber 130 may be measured substantially perpendicularly to a local surface of the rotor rim or the stator rim to which the active elements are connected, e.g. attached.

The radiation absorbers may be mounted in the electrical machine in a variety of ways. In examples, such as the example of FIG. 3, the radiation absorbers (sheets or other) may be mounted at the stator or rotor rim. I.e. the radiation absorbers may be mounted at or near the "foot" or base of the coils, or the base of the permanent magnet (module). In other examples, the radiation absorbers may be attached at one or more points to the neighboring active element(s). E.g. an adhesive may be used for this purpose. Combination of these methods of mounting are also possible.

Figure 4:
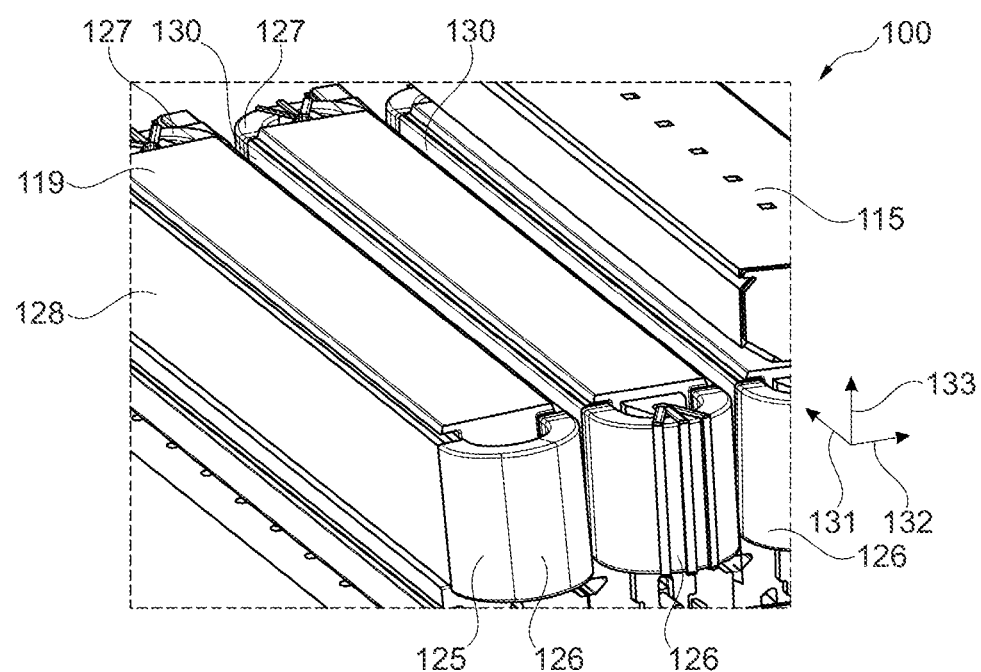
FIG. 4 schematically illustrates an enlarged perspective view of the electrical machine of FIG. 3 with some active rotor elements removed.

FIG. 4 schematically illustrates an enlarged perspective view of the electrical machine 100 of FIG. 3 with some active rotor elements removed. A plurality of coils 125 wound around stator teeth 119 may be seen. As in FIG. 3, the active rotor elements 115 are permanent magnet modules. Two radiation absorbers 130 may be seen between adjacent coils. A radiation absorber 130 may partially or totally extend along a length of an active element 115, 125. In FIG. 4, the radiation absorbers 130 partially extend along the length of the coils 125 (measured along an axial direction 131).

An active element 115, 125 e.g. a coil in FIG. 4, may have a central portion 128, a first longitudinal end portion 126 and a second opposite longitudinal end portion 127. In FIG. 4, the radiation absorbers 130 do not extend between adjacent end portions 126, 127 of coils 125. In other examples, a radiation absorber 130 may extend between end portions 126, 127 of adjacent active elements, e.g. only between the end portions. A radiation absorber 130 may extend between first end portions 126 and/or between second end portions 127 of the active element.

In some examples, as e.g. in FIGS. 3 and 4, the radiation absorber 130 may be a sheet. A sheet may have a suitable shape for being arranged in a relatively small gap 117 between adjacent active elements and for optimizing the absorption of thermal radiation emitted by the active elements. A sheet may have a first face and a second face. The first face may be arranged facing the first active element 121, and the second face may be arranged facing the second active element 122. The sheet may have a thickness, i.e. a width, between 0.1 and 5 millimeters (mm), and more in particular between 0.2 and 1 millimeters, e.g. about 0.5 mm.

Figure 5:
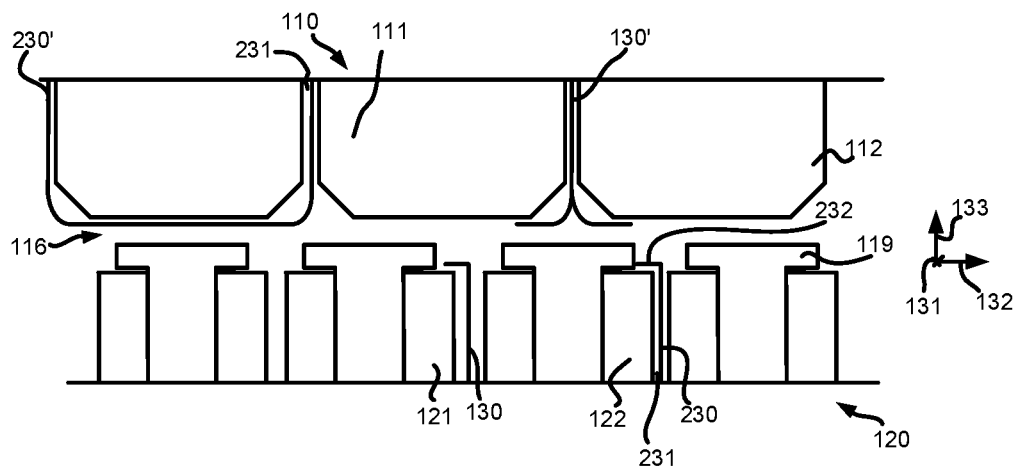
FIG. 5 schematically illustrates several examples of radiation absorbers in an enlarged cross-sectional view of the electrical machine of FIGS. 3 and 4.

A radiation absorber 130 may extend beyond an active element 115, 125. FIG. 5 shows several examples of radiation absorbers in an enlarged cross-sectional view of the electrical machine 100 of FIGS. 3 and 4. In this example, a rotor radiation absorber 130' extends beyond adjacent active rotor elements 111, 112 into the air gap 116. A stator radiation absorber 130 also extends beyond adjacent active stator elements 121, 122 into the air gap 116. The rotor radiation absorber 130' curves around the first active element 111 and around the second active element 112. The rotor radiation absorber 130' has a substantially T-shape in cross section in this example, but it may have other shapes in other examples. The stator radiation absorber 130 curves around the first active stator element 121. The stator radiation absorber 130 has a substantially L-shape in cross section in this example, but it may have other shapes in other examples. A radiation absorber 130, 130' may be configured to extend beyond one or more adjacent active elements 115, 125 and adapt to a contour of one or more of the adjacent active elements 115, 125.

In some examples, a radiation absorber 230, 230' may be configured to form a cooling channel 231. It may be understood that a radiation absorber is configured to form a cooling channel 231 when the radiation absorber is configured to be part of a cooling channel 231 through which a cooling fluid may be guided. The radiation absorber 230 in this case may be mounted directly to the rim (of the rotor in this case, but it should be clear that the same is possible for the stator) at two different points, between a first and a second active element, and between the second and a third active element.

The cooling channel 231 has a closed contour in cross-section. A cross-section of a cooling channel (and of a radiation absorber) may be taken as substantially perpendicular to a direction in which a cooling fluid is injected between the adjacent active elements. For example, a cooling fluid may flow axially 131 through the cooling channels 231, and a cross-section may extend in the radial 133 and circumferential 132 directions. Once attached to e.g. a rotor or a stator, a radiation absorber 230, 230' may form a portion of the conduit. For example, a radiation absorber may form one or more walls of the conduit.

If a cooling fluid, e.g. air, is introduced in a cooling channel 231, the contact between a cooling fluid and an active element may be enhanced. Cooling efficiency may be therefore improved when compared to cooling without a radiation absorber forming a cooling channel. It is noted that increasing the contact between the cooling fluid and the active element may also be achieved by a radiation absorber which does not form a cooling channel 231. For example, in FIG. 5, radiation absorbers 130 and 130' may also increase the contact between a cooling fluid and the adjacent active elements as they restrict the movement of the cooling fluid in a circumferential direction 132. Accordingly, cooling may be also enhanced with respect to a situation in which a radiation absorber 130, 130' is absent.

In some examples, in order to form a cooling channel 231, an end portion 232 of a radiation absorber may be attached to an active element support 119. For example, if an active stator element 125 is a coil, an end portion 232 of a radiation absorber may be attached to a tooth 190 around with the coil is wound. An example of attachment to a tooth 119 has been schematically shown in FIG. 5, where the short wall of the L-shaped radiation absorber 230 is attached to tooth 119 of coil 122. In such an example, the flow of the cooling fluid towards air gap 116 may be avoided as long as the absorber 230 is joined to the tooth 119, e.g. along a whole length (in the axial direction 131) of the coil 122.

In some examples, in order to form a cooling channel 231, an end portion of a radiation absorber may be attached to an active element. For example, if radiation absorber 131' of FIG. 5 was to form a cooling channel, the end portions extending in a circumferential direction 132 may be attached to active rotor elements 111 and 112, e.g. without entering the air gap 116.

In some examples, a radiation absorber 230' may have a C or U-shape in cross section. For example, a radiation absorber configured to completely surround an active element in cross-section, e.g. a rotor element 115, may be provided. In such a case, as schematically shown in FIG. 5, a radiation absorber 230' joined to the rotor rim and completely surrounding e.g. active rotor element 111 is provided.

A radiation absorber 130, 130', 230, 230' configured to form a cooling channel may comprise one or more walls. For example, if a radiation absorber has a C-shape in cross-section, it may be said that the radiation absorber has one wall. But if for example a radiation absorber has a L-, a T-shape or a U-shape in cross-section, it may be formed by two or more walls. Two walls, e.g. a first and a second wall, may be substantially perpendicular between them.

A radiation absorber 130, 130', 230, 230' may be joined or connected to a rotor rim or to a stator rim by any suitable fastener or means. In some examples, a T-block or a wedge may be used as fasteners. A radiation absorber 130 may not necessarily be directly attached to a rotor or stator rim, but it may be attached to a base of one or more active element supports 119. For example, a radiation absorber 130 may be attached between two teeth 119 configured to support coils, as illustrated in the example of FIG. 3.

Figure 6:
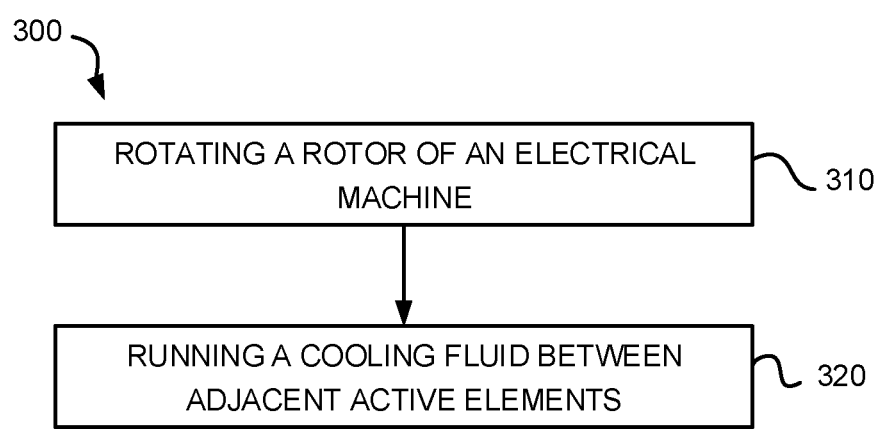
FIG. 6 schematically illustrates a flowchart of an example of a method for cooling active rotor elements and/or active stator elements.

In a further aspect of the disclosure, a method 300 is provided. The method is schematically illustrated in FIG. 6.

The method comprises, at block 310, rotating a rotor 110 of an electrical machine 100. The electrical machine 100 may be an electrical machine 100 as described with respect to FIGS. 3-5. I.e., the electrical machine comprises a rotor 110 and a stator 120, the rotor 120 comprising a plurality of active rotor elements 115 and the stator 120 comprising a plurality of active stator elements 125. The electrical machine further comprises an air gap 116 separating the active rotor elements 115 and the active stator elements 125. In some examples, the electrical machine 100 may be a generator 42, in particular a generator for a wind turbine, and more in particular a generator for a direct drive wind turbine.

The method further comprises, at block 320, running a cooling fluid between adjacent active rotor elements 115 and between adjacent active stator elements 125 such that the cooling fluid also flows around a plurality of radiation absorbers 130 included at least between one of adjacent active rotor elements 115 and adjacent active stator elements 125.

According to this aspect, thermal radiation emitted by adjacent active elements may be absorbed by radiation absorbers 130 arranged between the adjacent active elements. As the cooling fluid contacts the radiation absorbers 130 when flowing around them, the cooling fluid may take heat away from the radiation absorbers 130 (and the active elements 115, 125) by convection. Although the radiation absorbers 130 may hinder the flow of the cooling fluid between adjacent active elements, the thermal radiation absorbed by them 130, and thus the heat not reaching the adjacent active elements, may compensate the cooling effect lost due to hindering the flow of the cooling fluid with the radiation absorbers 130 arranged in the rotor and/or the stator 120.

The radiation absorbers 130 may be arranged in the rotor 110 and/or in the stator 120. The radiation absorbers 130 may have one or more features already explained with regard to FIGS. 3-5. For example, the radiation absorbers 130 may be alloy metal sheets.

A cooling fluid may be air in some examples. The cooling fluid may be run between the active rotor elements and between the active stator elements in an axial direction 131 in some examples.

Rotation of the rotor may be started before, after or at a substantially same time than running a cooling fluid.

In some examples, rotating the rotor includes rotating a plurality of wind turbine blades 22 by the action of the wind. In these examples, the electrical machine 100 is a generator 42. The generator 42 may be directly driven or driven through a gearbox.

In a further aspect of the disclosure, a generator 42 for a wind turbine 10 is provided. The generator 42 comprises a rotor 110 and a stator 120. The rotor comprises a plurality of active rotor elements 115. The stator comprises a plurality of active stator elements 125. The generator further comprises an air gap 116 that separates the active rotor elements 115 and the active stator elements 125. The generator 42 further comprises a plurality of radiation absorbers 130 arranged between adjacent active rotor elements 111, 112 and/or between adjacent active stator elements 121, 122.

The air gap 116 may be a radial 133 air gap in some examples.

In some examples, the plurality of radiation absorbers 130 may be a plurality of sheets. In some examples, one or more sheets of the plurality of sheets, e.g. all the sheets, may have a thickness between 0.1 and 5 millimeters, more in particular between 0.1 and 3 millimeters, and more in particular between 0.2 and 1 millimeters.

In some examples, an absorptivity of the plurality of sheets, i.e. of each sheet of the plurality of sheets, may be 0.95 or more.

The description with respect to FIGS. 3-5 applies to this aspect.

This written description uses examples to disclose the teaching, including the preferred embodiments, and also to enable any person skilled in the art to practice the herein disclosed teaching, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application. If reference signs related to drawings are placed in parentheses in a claim, they are solely for attempting to increase the intelligibility of the claim, and shall not be construed as limiting the scope of the claim.

The invention claimed is:

1. An electrical machine, comprising:
a rotor comprising a plurality of active rotor elements;
a stator comprising a plurality of active stator elements;
wherein an air gap separates the active rotor elements and the active stator elements;
a radiation absorber arranged between a first active element and a second active element, wherein the first and second active elements are adjacent active rotor elements or adjacent active stator elements; and
wherein a first distance and a second distance measured in a circumferential direction are defined between the radiation absorber and the first active element and the second active element, respectively, such that a cooling fluid flows through the first and second distances and reduces a temperature of the first and second active stator elements and the radiation absorber.

2. The electrical machine of claim 1, wherein the radiation absorber comprises an absorptivity for thermal radiation of 0.8 or more.

3. The electrical machine of claim 1, wherein the first and second distances are substantially equal.

4. The electrical machine of claim 3, wherein the radiation absorber has a thickness between 1% and 20% of the first or second distance.

5. The electrical machine of claim 1, wherein the radiation absorber extends substantially completely along a height of the first and second active elements, the height measured perpendicularly to a local surface of a rotor rim or a stator rim to which the active rotor or stator elements are connected.

6. The electrical machine of claim 1, wherein the radiation absorber comprises one or more metal alloys.

7. The electrical machine of claim 1, wherein the radiation absorber comprises a surface treated to have an enhanced thermal radiation absorption capability.

8. The electrical machine of claim 1, wherein the radiation absorber comprises a sheet having a first face facing the first active element and a second face facing the second active element.

9. The electrical machine of claim 8, wherein the sheet comprises a thickness between 0.1 and 5 millimeters.

10. The electrical machine of claim 8, wherein the radiation absorber has a varying thickness along its height.

11. The electrical machine of claim 1, wherein the radiation absorber extends beyond the first and second active elements into the air gap.

12. The electrical machine of claim 1, wherein the radiation absorber follows a contour of first and second active elements.

13. The electrical machine of claim 1, wherein the electrical machine is a generator.

14. The electrical machine of claim 13, wherein the generator is a permanent magnet generator.

15. A wind turbine comprising the electrical machine of claim 14.

16. An electrical machine, comprising:
a rotor comprising a plurality of active rotor elements;
a stator comprising a plurality of active stator elements;
wherein an air gap separates the active rotor elements and the active stator elements:
a radiation absorber arranged between a first active element and a second active element, wherein the first and second active elements are adjacent active rotor elements or adjacent active stator elements; and
wherein the radiation absorber comprises an absorptivity for thermal radiation of 0.8 or more.

17. An electrical machine, comprising:
a rotor comprising a plurality of active rotor elements;
a stator comprising a plurality of active stator elements;
wherein an air gap separates the active rotor elements and the active stator elements:
a radiation absorber arranged between a first active element and a second active element, wherein the first and second active elements are adjacent active rotor elements or adjacent active stator elements; and
wherein the radiation absorber has a thickness between 1% and 20% of a distance between the first and second active elements.

18. An electrical machine, comprising:
a rotor comprising a plurality of active rotor elements;
a stator comprising a plurality of active stator elements;
wherein an air gap separates the active rotor elements and the active stator elements:
a radiation absorber arranged between a first active element and a second active element, wherein the first and second active elements are adjacent active rotor elements or adjacent active stator elements;
wherein the radiation absorber comprises a sheet having a first face facing the first active element and a second face facing the second active element; and
wherein the sheet comprises a thickness between 0.1 and 5 millimeters.

19. An electrical machine, comprising:
a rotor comprising a plurality of active rotor elements;
a stator comprising a plurality of active stator elements;
wherein an air gap separates the active rotor elements and the active stator elements:
a radiation absorber arranged between a first active element and a second active element, wherein the first and second active elements are adjacent active rotor elements or adjacent active stator elements; and
wherein the radiation absorber extends beyond the first and second active elements into the air gap.

* * * * *